United States Patent
Chao

(10) Patent No.: US 6,518,711 B2
(45) Date of Patent: Feb. 11, 2003

(54) HALOGEN LAMP ELECTRONIC TRANSFORMER

(76) Inventor: Wen-Shin Chao, No.97,Sec.3, Chang Mei Road, Ho Mei Chen, Chang Hua Hsien (TW)

(*) Notice: Subject to any disclaimer, the term of this patent is extended or adjusted under 35 U.S.C. 154(b) by 0 days.

(21) Appl. No.: 09/764,267

(22) Filed: Jan. 19, 2001

(65) Prior Publication Data

US 2002/0097006 A1 Jul. 25, 2002

(51) Int. Cl.[7] ............................................. H05B 37/02
(52) U.S. Cl. .................. 315/209 R; 315/276; 315/289; 315/291; 315/DIG. 7; 363/133; 363/139
(58) Field of Search ............................. 315/209 R, 247, 315/276, 291, 56, 70, 71, 206, DIG. 7, 289, 290; 363/133, 139, 132

(56) References Cited

U.S. PATENT DOCUMENTS

| | | | | |
|---|---|---|---|---|
| 5,159,245 A | * | 10/1992 | Nilssen | 315/206 |
| 5,740,021 A | * | 4/1998 | Lecheler et al. | 315/224 |
| 5,828,188 A | * | 10/1998 | Lecheler | 315/225 |
| 6,084,362 A | * | 7/2000 | Chao | 315/209 R |
| 6,144,568 A | * | 11/2000 | Franck et al. | 315/224 |
| 6,157,551 A | * | 12/2000 | Barak et al. | 363/37 |
| 6,246,182 B1 | * | 6/2001 | Yamasaki et al. | 315/209 R |

* cited by examiner

*Primary Examiner*—Haissa Philogene
(74) *Attorney, Agent, or Firm*—Troxell Law Office PLLC

(57) ABSTRACT

A halogen lamp electronic transformer a power supply circuit, a voltage divider circuit, a control circuit, inductive coils, a push pull oscillator circuit, and a triggering and overload protection circuit. The push pull oscillator circuit consists of a plurality of push pull oscillator transistors, the bases of which are respectively connected to the positive ends of a plurality of inductive coils, with their emitters connected to the negative ends. As such, the positive electrical potential polarity reversal induced at the positive end of the plurality of inductive coils and the negative electrical potential reversal induced at the negative end of the inductive coils switch out and connect the plurality of push pull oscillator transistors to provide for the alternating continuity and cut off of the push pull transistors. This enables the reverse polarity of voltage dividing by the plurality of inductive coils and provides for the current dividing of the current flowing through the push pull oscillator transistors which reduces the heat generated by the push pull oscillator transistors and prolongs their service life.

2 Claims, 3 Drawing Sheets

HALOGEN LAMP ELECTRONIC TRANSFORMER

BACKGROUND OF THE INVENTION

1. Field of the Invention

The invention herein relates to an improved halogen lamp electronic transformer specifically one in which a plurality of half bridge-type push pull oscillator circuits are interconnected and, furthermore, though a plurality of inductive coils induces a reversal of polarity for alternating the continuity and cut off such that the plurality of inductive coils achieves voltage dividing and the plurality of push pull oscillator transistors through which the current flows achieve current dividing, enabling forward current or reverse current converging through a primary coil to supply the power source of the halogen light bulb, while achieving a reduction in heat generated by the push pull oscillator transistors and the inductive coils to prolong their service life and, furthermore, decrease production costs, while being capable of driving high power halogen light bulbs; furthermore, of the two voltage dividing capacitors at the two sides of the midpoint voltage, one voltage dividing capacitor is connected to a control circuit, the control circuit consisting of a current limiting resistor connected in series with a light emitting diode; when there is a power source or a transformer abnormality, defective light bulb or poor contact at the socket, a transformer output short circuit, or an overload from an improperly installed light bulb, the voltage dividing capacitor produces varying degrees of abnormal voltages such that the light emitting light diode of the control circuit, according to different situations, produces differing degrees of flashing or remains unlit which without affecting normal operation achieves with a minimum of components the capability to easily determine the cause of malfunctions.

2. Description of the Prior Art

A previously invented electronic transformer that has been granted U.S. Pat. No. 6,084,362 (shown in FIG. 1) by the US Patent and Trademark Office is comprised of three inductive coils T1, T2, and T3 and, furthermore, a push pull circuit consisting of two push pull oscillator transistors Q1 and Q2 consisting a half bridge-type push pull oscillator circuit, wherein the two inductive coils T2 and T3 are respectively coupled to the bases of the two push pull oscillator transistors Q1 and Q2 and through a variable resistor VR, a capacitor C5, and a bidirectional current limiting diode DIAC comprising a trigger circuit output signal that brings the transistor Q2 into continuity, such that when current flows through the inductive coil T1 and the transistor Q2, the inductive coil T3 produces a positive voltage conducted though the transistor Q, while the inductive coil T2 accordingly produces a negative voltage, and switching out the transistor Q2 causes current to pass through the transistor Q1 and the inductive coil T1, at which time the inductive coils T1 and T2 respective induce a reverse voltage and as such this enables the transistors Q1 and Q2 to alternate continuity, thereby forming a semi-resonant push pull oscillator circuit that supplies a load voltage LP; however, since the three inductive coils that respectively drive the push pull oscillator transistors are utilized for a high power load and are unable to withstand such a load, the transistors heat up and are destroyed, it is necessary to increase the windings of the inductive coils and utilize higher power transistors so the transistors are capable of withstanding the large current and, furthermore, the component heating that readily results proportionately increases the malfunction rate and raises production cost; as such, when the circuit is installed to sustain a larger load, its performance is inadequate.

In view of the above situation, the inventor of the invention herein, having accumulated numerous years of experience in electronic transformer production, conducted extensive research that culminated in the successful development of the invention herein which improves upon the said shortcomings.

SUMMARY OF THE INVENTION

The primary objective of the invention herein is to provide an improved halogen lamp electronic transformer in which the output end of a bidirectional current limiting diode of the said triggering circuit is respectively connected to a diode as well as the bases of push pull oscillator transistors utilized for switching on such that the said triggering circuit is capable of synchronous triggering performance.

Another objective of the invention herein is to provide an improved halogen lamp electronic transformer in which a plurality of half bridge-type push pull oscillator circuits are interconnected and, furthermore, the bases of each push pull oscillator transistor are connected to the positive voltage ends of inductive coils, while the emitters of each push pull oscillator transistor are connected to the negative voltage ends of the inductive coils, enabling a forward current to flow through a primary inductive coil such that its plurality of inductive coils of the same polarity achieve a positive electrical potential that reverses polarity to bring the plurality of push pull oscillator transistors into continuity, while the positive electrical potential reverse polarity induces the plurality of inductive windings of the opposite polarity to divide the voltage of the negative voltage outputted, switching out the plurality of push pull oscillator transistors connected to the plurality of the inductive coils of the opposite polarity such that the current flowing through is current divided and respectively flows through the plurality of push pull oscillator transistors and then converges through the primary inductive coil to form a reverse current; under the alternating continuity of the plurality of push pull oscillator transistors, the reverse current flows through the output transformer, providing the halogen light bulb a power source, achieving the polarity reversal for the voltage dividing by the plurality of inductive coils, and providing for the current dividing of the current flowing through the plurality of push pull oscillator transistors, thereby achieving a reduction in the heat generated by the push pull oscillator transistors and decreasing production cost and, furthermore, with the capability of driving high power halogen lamps.

Yet another objective of the invention herein is to provide an improved halogen lamp electronic transformer in which the control circuit consists of a current limiting resistor connected in series with a light emitting diode that are both shunted across the voltage dividing capacitor; when there is power source or transformer abnormality, defective light bulb or poor contact at the socket, a transformer output short circuit, or an overload from an improperly installed light bulb, the voltage dividing capacitor produces varying degrees of abnormal voltages such that the light emitting light diode of the control circuit, according to different situations, produces differing degrees of flashing or remains unlit which without affecting normal operation achieves with a minimum of components the capability to easily determine the cause of malfunctions.

To enable the examination committee a further understanding of the technological content, operation, and other features of the invention herein, the brief description of the drawings below are followed by the detailed description of the drawings.

DETAILED DESCRIPTION OF THE INVENTION

Figure 1:
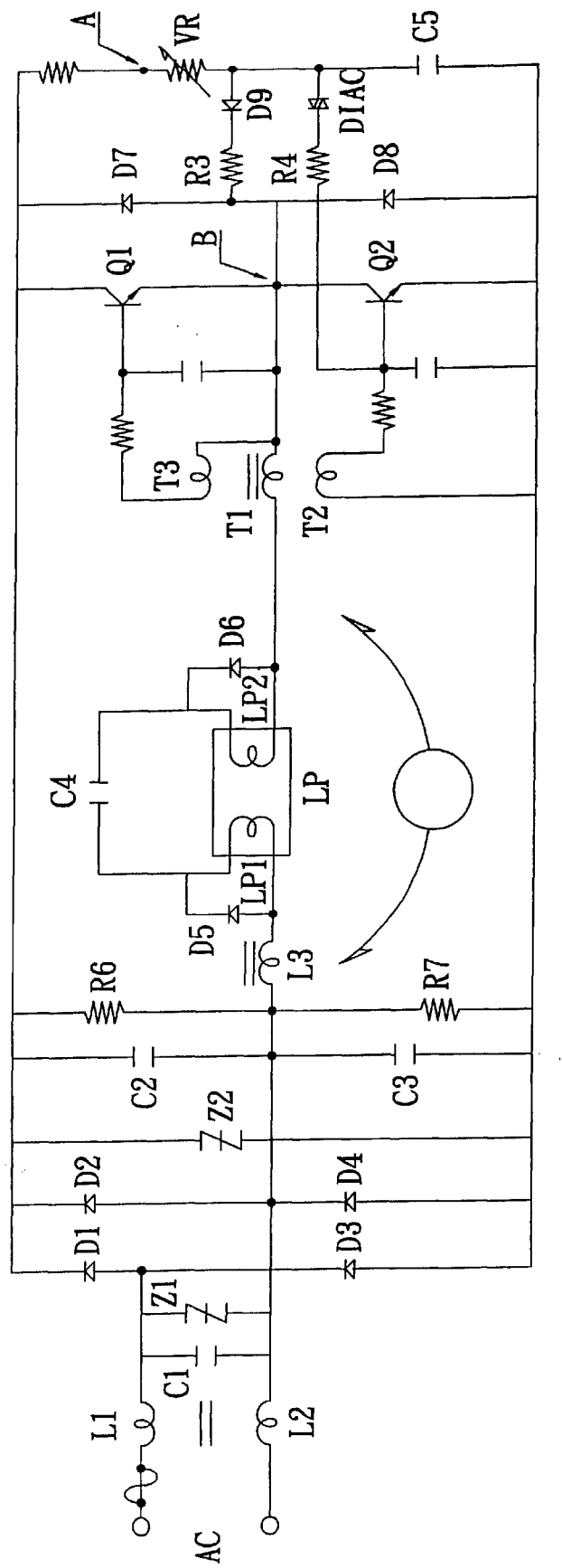
FIG. 1 is a schematic diagram of U.S. Pat. No. 6,084,362.
Figure 2:
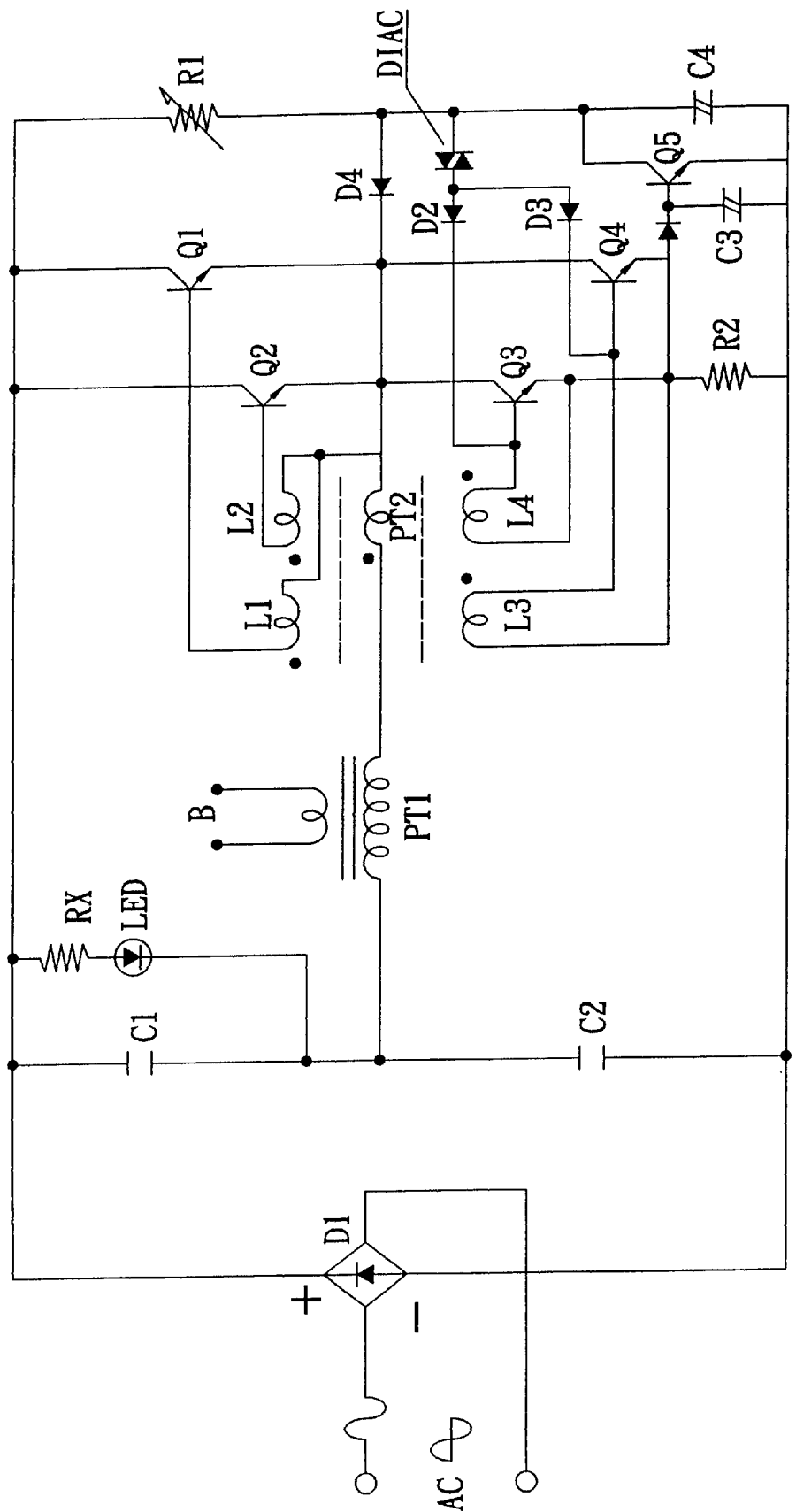
FIG. 2 is schematic diagram of the invention herein.

Referring to FIG. 2, the two output ends of a bridge-type rectifier D1 are respectively connected to the two capacitors C1 and C2, with the center line from the area of conjoinment between C1 and C2 constituting a midpoint voltage output and the center line is coupled to an output transformer PT1 of a halogen light bulb B and then to a primary coil PT2; the primary coil PT2 is respectively linked to the emitters of a first and a second push pull oscillator transistor Q1 and Q2, the collectors of a third and a fourth push pull oscillator transistor Q3 and Q4, the negative ends of a first and a second inductive coil L1 and L2, and the output end of a fourth diode D4; the positive ends of a third and a fourth inductive coil L3 and L4 are respectively conjoined to the bases of the third and the fourth push pull oscillator transistor Q3 and Q4 as well as the output ends of a second and a third diode D2 and D3, with the input ends of the second and the third diode D2 and D3 connected to the output end of a bidirectional current limiting diode DIAC; furthermore, the emitters of the third and the fourth push pull oscillator transistor Q3 and Q4 are respectively connected to the negative ends of the third and the fourth inductive coil L3 and L4, a second resistor R2, and the input end of a fifth diode D5 of a trigger and overload protection circuit; the output end of the fifth diode D5 of the trigger and overload protection circuit is connected to the base of a fifth transistor Q5 and a third capacitor C3 and, furthermore, the collector and the emitter of a fifth transistor Q5 are connected to a fourth capacitor C4 as well as the input end of the bidirectional current limiting diode DIAC, the input end of a fourth diode D4, and a variable resistor R1, respectively.

Furthermore, the control circuit consists of a current limiting resistor RX connected in series with a light emitting diode LED that are both shunted across the voltage dividing capacitor C1.

When the circuit is switched on and current is outputted, current flows through the variable resistor R1 to charge the fourth capacitor C4 and as the electrical potential of the bidirectional current limiting diode DIAC is triggered, the bidirectional current limiting diode DIAC is brought into continuity such that current flows respectively from the second and the third diode D2 and D3 to the bases of the third and the fourth push pull oscillator transistor Q3 and Q4 and at the same time, the conducting third and fourth push pull oscillator transistor Q3 and Q4 causes current to flow through the first capacitor C1, the output transformer PT1, the primary coil PT2, as well as the third and the fourth push pull oscillator transistor Q3 and Q4 such that the current flowing through the third and the fourth push pull oscillator transistor Q3 and Q4 is effectively divided, while they along with primary coil PT2 and the similarly phased first and the second inductive coil L1 and L2 induce a polarity reversal of positive electrical potential that triggers the continuity of the first and the second push pull oscillator transistor Q1 and Q2; at the same time, the induction between the primary coil PT2 and its reverse phased third and fourth inductive coil L3 and L4 causes a negative voltage at the bases of the third and the fourth push pull oscillator transistor Q3 and Q4, thereby switching out the third and the fourth push pull oscillator transistor Q3 and Q4; as a result, the current is thus reversed respectively through the first and the second push pull oscillator transistor Q1 and Q2, then converges in the opposite direction at the primary coil PT2 and the output transformer PT1, and flows through the second capacitor C2 back to the power source, thereby enabling the switching on of the halogen light bulb B; the current flowing in the opposite direction achieves a negative electrical potential via the first and the second inductive coil L1 and L2 such that the first and the second push pull oscillator transistor Q1 and Q2 are switched out, while the third and fourth inductive coil L3 and L4 attain a positive electrical potential, enabling the continuity of the third and the fourth push pull oscillator transistor Q3 and Q4 such that the current then flows from the first capacitor C1 via the output transformer PT1 and the primary coil PT2 and respectively through the third and the fourth push pull oscillator transistor Q3 and Q4, and then converges through the second resistor R2; as such, the cyclic action forms a full bridge-type push pull oscillator circuit capable of current dividing by means of the push pull oscillator transistors through which the current flows as well as voltage dividing by the electrical polarity reversal achieved by the inductive coils, thereby providing for a reduction in component-generated heat to prolong the service life of components as well as achieving the objective of decreased production cost due to the use of low power push pull oscillator transistors capable of high power loads.

Figure 3:
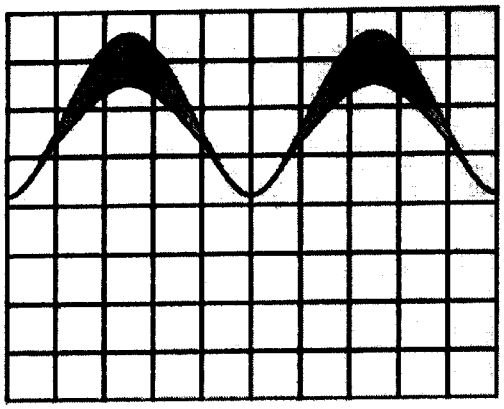
FIG. 3 is a drawing of the signal wave form at the two ends of the control circuit light emitting diode of the invention herein when it in continuity during normal operation.

Furthermore, the light emitting diode LED of the control circuit receives its signal from the first capacitor C1; flashing to indicate circuit or load abnormality status, the LED determines power supply or output transformer abnormality, load abnormality, whether the output is short circuited, and overload situations, with the various signal wave forms measured listed below:

1) FIG. 3: The wave form measured during normal operation.

Figure 4:
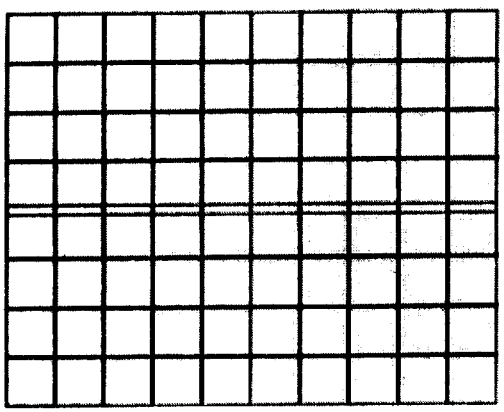
FIG. 4 is a drawing of the signal wave form at the two ends of the control circuit light emitting diode of the invention herein when no current is present.

2) FIG. 4: No signal wave form measured when the circuit is switched off.

Figure 5:
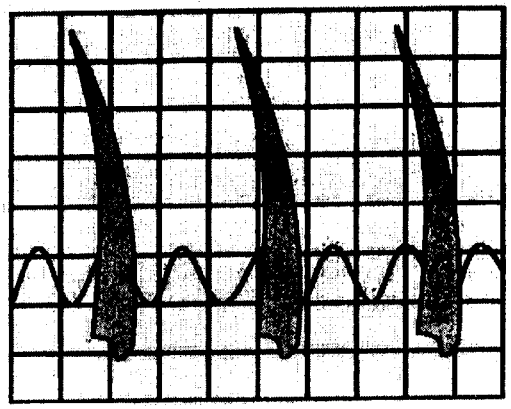
FIG. 5 is a drawing of the signal wave form at the two ends of the control circuit light emitting diode of the invention herein when power is outputted to the halogen lamp.

3) FIG. 5: The wave form displayed when the halogen light bulb circuit is shorted out; the said light emitting diode LED flashes slowly and the halogen light bulb remains unlit.

Figure 6:
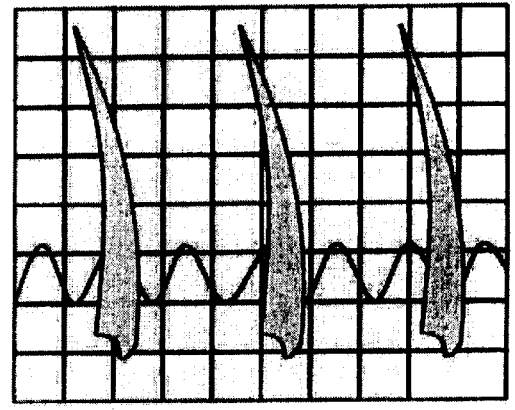
FIG. 6 is a drawing of the signal wave form at the two ends of the control circuit light emitting diode of the invention herein when the halogen lamp is incorrectly installed and an overload occurs.

4) FIG. 6: The wave form displayed when the halogen light bulb is overloaded; the said light emitting diode flashes rapidly, while the halogen light bulb remains unlit or flickers.

Figure 7:
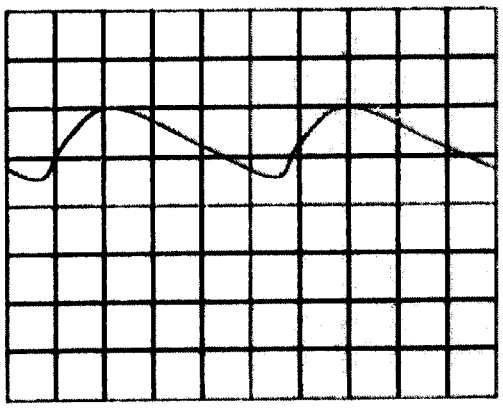
FIG. 7 is a drawing of the signal wave form at the two ends of the control circuit light emitting diode of the invention herein when the halogen lamp is damaged or defective.

5) FIG. 7: The wave form displayed when the halogen light bulb is damaged or defective; the said light emitting diode LED glows since the signal from the output transformer is maintained, but the halogen light bulb is unlit.

As such, in the event of a power source abnormality or a transformer abnormality, both the light emitting diode LED and the halogen light bulb remain unlit and, as per the situations illustrated above, the various malfunctions are easily determined and, furthermore, identified according to their displayed wave form; the said control circuit does not affect the normal operation of the overall circuit and utilizing minimum components, the control circuit is capable of effectively determining the nature of an abnormality.

Furthermore, in the full bridge-type dual push pull oscillator circuit of the invention herein, a greater plurality of push pull oscillator transistors can be integrated along with a matching plurality of inductive coils for virtually unlimited extension to drive higher powered halogen light bulbs, thereby enabling an expansion of usable performance without circuit modification In summation of the foregoing section, since the control circuit of the invention herein utilizes an extremely simplified full bridge-type dual push pull oscillator circuit that achieves reduced component temperature and prolonged service life and, furthermore, is capable of driving high power loads with low power components to decrease production cost and also has the practical advantage of being expandable without circuit modification.

What is claimed is:

1. An improved halogen lamp electronic transformer comprising a power supply circuit, a voltage divider circuit, a control circuit, inductive coils, a push pull oscillator circuit, and a triggering and overload protection circuit, the innovative features of which include:

a full bridge dual push pull oscillator circuit consisting of a pair of half bridge oscillator circuits in a combined arrangement, wherein first and fourth push pull oscillator transistors of one of the pair of half-bridge oscillator circuits are respectively connected to two phase reversed inductive coils, with second and third push pull oscillator transistors of another of the pair of half-bridge oscillator circuits respectively connected to two other phase reversed inductive coils, by which electrical current flows are capable of current dividing;

a bidirectional current limiting diode, an output end of which is connected to the bases of the third and the fourth push pull oscillator transistors for the simultaneous triggering of continuity;

wherein, when a halogen light bulb is supported by a power source, component generated heat is reduced to prolong the service life of the components and to achieve a decrease in production cost.

2. The improved halogen lamp electronic transformer of claim 1 wherein the power source is respectively connected to first and second capacitors wherein a center line between the two capacitors constitutes a midpoint voltage output, with the center line coupled to an output transformer of the halogen light bulb and then to a primary coil;

a control circuit consisting of a current limiting resistor in series with a light emitting diode that are both shunted across the first capacitor; said light emitting diode receiving signals from the first capacitor and the light emitting diode flashing to indicate circuit status and determine whether there is a power supply or output transformer abnormality, a load abnormality, a short circuited output, or an overload situation, to provide the control circuit capable of determining the cause of abnormalities.

* * * * *